(12) United States Patent
Pohjola et al.

(10) Patent No.: US 10,894,560 B2
(45) Date of Patent: Jan. 19, 2021

(54) TRACK BELT AND A TRACK ASSEMBLY

(71) Applicant: Finncat Oy, Kello (FI)

(72) Inventors: Matti Pohjola, Ylikiiminki (FI); Kalle Pohjola, Kello (FI); Olli Pohjola, Ylikiiminki (FI)

(73) Assignee: Finncat Oy, Kello (FI)

( * ) Notice: Subject to any disclaimer, the term of this patent is extended or adjusted under 35 U.S.C. 154(b) by 0 days.

(21) Appl. No.: 16/421,527

(22) Filed: May 24, 2019

(65) Prior Publication Data

US 2019/0276076 A1 Sep. 12, 2019

Related U.S. Application Data

(63) Continuation of application No. PCT/FI2017/050819, filed on Nov. 24, 2017.

(30) Foreign Application Priority Data

Nov. 25, 2016 (FI) ...................................... 20165901

(51) Int. Cl.
*B62D 11/22* (2006.01)
*B62D 55/253* (2006.01)
*B62M 27/02* (2006.01)

(52) U.S. Cl.
CPC ............ *B62D 11/22* (2013.01); *B62D 55/253* (2013.01); *B62M 27/02* (2013.01); *B62M 2027/027* (2013.01)

(58) Field of Classification Search
CPC ...... B62D 11/22; B62D 55/253; B62D 55/24; B62M 27/02; B62M 2027/027
See application file for complete search history.

(56) References Cited

U.S. PATENT DOCUMENTS 2,363,015 A 11/1944 Norelius
3,108,564 A 10/1963 Prosser
(Continued)

FOREIGN PATENT DOCUMENTS

DE 1556544 A1 3/1970
FI 870397 A 7/1988
(Continued)

OTHER PUBLICATIONS

European Patent Office, Supplementary Search Report of European patent application EP17874896, dated May 28, 2020, 2 pages.

*Primary Examiner* — Ruth Ilan
*Assistant Examiner* — Harold Eric Pahlck, III
(74) *Attorney, Agent, or Firm* — Berggren LLP

(57) ABSTRACT

A track belt comprises a bearing element having an inner surface, an outer surface and a width. On the inner surface, a guide element extends in the longitudinal direction of the track belt, comprising a first edge protrusion and a second edge protrusion. The width of the guide element is substantially smaller than the width of the bearing element. The track belt comprises a first guide groove having a first flank surface formed by the first edge protrusion, and a second guide groove having a first flank surface formed by the second edge protrusion. The first flank surfaces of the edge protrusions are uniform and continuous substantially over the entire length of the guide element. Preferably, the guide element comprises a traction surface parallel to the inner surface of the bearing element, having engaging members for receiving the engaging parts of the drive wheel.

19 Claims, 3 Drawing Sheets

(56) References Cited

U.S. PATENT DOCUMENTS

| | | | |
|---|---|---|---|
| 3,973,638 A | | 8/1976 | Pohjola |
| 4,188,076 A | * | 2/1980 | Pohjola ................. B62D 55/24 |
| | | | 305/165 |
| 4,714,125 A | | 12/1987 | Stacy, Jr. |
| 6,517,457 B2 | * | 2/2003 | Schempf ................ B62D 11/22 |
| | | | 474/152 |
| 2001/0031680 A1 | | 10/2001 | Schempf et al. |
| 2009/0025988 A1 | | 1/2009 | Jacobsen et al. |
| 2009/0152037 A1 | | 6/2009 | Brazier |

FOREIGN PATENT DOCUMENTS

| | | | |
|---|---|---|---|
| FI | 78873 B | 6/1989 | |
| FR | 3001447 A1 | 8/2014 | |
| GB | 2325904 | * 12/1998 | ............ B62D 55/24 |
| JP | H09156549 A | 6/1997 | |
| WO | 2007061397 A1 | 5/2007 | |

\* cited by examiner

TRACK BELT AND A TRACK ASSEMBLY

PRIORITY

This application is a continuation of International Application No. PCT/FI2017/050819, filed on Nov. 24, 2017, which claims priority to Finnish patent application No. 20165901, filed on Nov. 25, 2016, the content of which is incorporated herein by reference.

FIELD OF THE INVENTION

The invention relates to a track belt comprising a bearing element, the bearing element having an inner surface, an outer surface, and a width, a guide element provided on the inner surface of the bearing element and extending in the longitudinal direction of the track belt, the guide element comprising a first edge protrusion and a second edge protrusion, and the guide element having a width substantially smaller than the width of the bearing element, the track belt comprising a first guide groove having a first flank surface formed by the first edge protrusion, and a second guide groove having a first flank surface formed by the second edge protrusion. The invention further relates to a track assembly comprising a track belt according to the invention.

BACKGROUND

In off-road vehicles, the driving structure is often a track belt in the form an endless belt travelling around two reverse rolls supported to the frame of the vehicle. Such a tracked vehicle may be steered by a steering device, such as skis, arranged in front of the vehicle. Tracked vehicles are also known which are steered by bringing the track belt into a curved shape in the travel direction of the vehicle. In such tracked vehicles, separate steering devices are not necessarily needed in addition to the track belt.

Publication U.S. Pat. No. 4,714,125 discloses a snow mobile with a bendable endless track belt. The snow mobile comprises an elongated tunnel formed steering assembly with guide protrusions received in grooves at the outer edges of the track belt. The snow mobile is steered in the desired direction by bringing the steering assembly and the track belt supported by the steering assembly to a curve with respect to the travel direction of the vehicle.

A tracked vehicle equipped with a bendable track belt is also known, in which the track belt comprises an actual bearing element and a guide element placed on the surface of the bearing element and extending in the longitudinal direction of the track belt. The guide element is a ridge or a protrusion which protrudes from the inner surface of the bearing element and whose edges are provided with a groove. Guide rolls are used to subject the groove to a lateral force bending the track belt into a curve. The central portion of the bearing element is inextensible in the longitudinal direction of the track belt; in other words, its length remains unchanged when the track belt is curved. The inner surface of the central portion is provided with engaging members which are subjected to the force of the drive wheel driven by the motor of the vehicle, for moving the track belt. The edge parts of the bearing element are made in the form of parts extensible in the longitudinal direction of the track belt, enabling the track belt to curve. The guide element is formed of pieces separated from each other in the longitudinal direction and spaced by gaps. These gaps improve the turning capacity of the track belt and make it possible for the track belt to turn around the reverse rolls at the ends of the track.

The track belt equipped with a guide element involves an problem that the guide rolls may protrude from the grooves at the side edges of the guide element via the gap between the pieces, whereby the vehicle loses its steerability. This problem is manifested particularly when the vehicle is moved on a rough surface having a strong effect on the shape of the track belt.

SUMMARY OF THE INVENTION

It is an aim of the invention to present a track belt and a track assembly, by which problems involved in the prior art can be eliminated.

The aims of the invention are achieved with a track belt and a track assembly characterized in what will be presented in the characterizing part of the independent claim. Some advantageous embodiments of the invention will be presented in the dependent claims.

The invention relates to a track belt comprising a bearing element having an inner surface, an outer surface, and a width. On the inner surface of the bearing element, a guide element extends in the longitudinal direction of the track belt, comprising a first edge protrusion and a second edge protrusion. The guide element has a width substantially smaller than the width of the bearing element. The width of the guide element refers to the shortest distance between the free edge of the first edge protrusion and the free edge of the second edge protrusion. The track belt comprises a first guide groove with a first flank surface formed by the first edge protrusion, and a second guide groove with a first flank surface formed by the second edge protrusion. The first flank surfaces of the edge protrusions are uniform and continuous substantially over the entire length of the guide element. Thus, the flank surfaces do not comprise gaps or spaces, through which the steering member running in the guide groove and applying a transverse force to the guide element could slip out of the guide groove.

In a preferred embodiment of the track belt according to the invention, the width of the guide element is less than 50% of the width of the bearing element, preferably less than 40% of the width of the bearing element, most preferably less than 30% of the width of the bearing element.

In another preferred embodiment of the track belt according to the invention, the first and second guide grooves comprise a second flank surface formed by the inner surface of the bearing element. Thus, the guide grooves are formed in the gap between the inner surface of the bearing element and the edge protrusions of the guide element.

In a third preferred embodiment of the track belt according to the invention, the guide element is a component that sustains tensile strain and is substantially inextensible at normal loading of the track belt. Preferably, the guide element comprises at least one reinforcing element improving the tensile strength in the longitudinal direction of the guide element. The reinforcing element may be a cord or a wire made of steel, glass fibre, carbon fibre, aramid, or Kevlar material and cast within the guide element.

In yet another preferred embodiment of the track belt according to the invention, the guide element comprises a traction surface that extends substantially in parallel with the inner surface of the bearing element and comprises engaging members for receiving the engaging parts of the drive wheel. Consequently, the motive power to the track belt is transferred from the drive wheel to the guide element, from which it is transferred to the bearing element. The traction surface may comprise bending grooves perpendicular to the longitudinal direction of the guide element, at substantially regular intervals over the entire length of the guide element. The bending grooves facilitate the bending of the guide element around a curved surface. Such a situation comes up, for example, when the endless track belt turns around the reverse rolls at the ends of the track. The depth of the bending grooves is selected so as not to extend through the edge protrusions to the guide grooves.

In yet another preferred embodiment of the track belt according to the invention, the bearing element is provided with folds transverse to the longitudinal direction of the track belt, substantially over the entire length of the track belt. The track belt may be brought to a curved shape by directing force to the guide element of the track belt in a transverse direction of the longitudinal direction of the track belt. In this context, the curved shape means that the middle part of the curved track belt is not on the same straight line with the ends of the track belt. As the track belt is curved, the length of its guide element is not changed but the edge closer to the centre of curvature of the bearing element becomes shorter, and the edge farther from the centre of curvature becomes longer. The folded shape of the bearing element allows for changes in the length of the edges of the bearing element so that when the edges of the bearing element become shorter and longer, the folds become narrower and wider, respectively.

The folds in the track belt also enable the turning of the track belt around a curved surface, such as the reverse rolls at the ends of the track. In this context, the turning of the track belt means that part of the length of the track belt will temporarily assume a cylindrical shape as it travels across the cylindrical surface. As the track belt turns around the reverse roll, the outermost face of the track belt farthest from the surface of the reverse roll stretches; in other words, the folds in the bearing element open. To enable the turning of the track belt, it is expedient that the folds of the bearing element extend over the entire width of the bearing element; that is, from the first edge up to the second edge of the bearing element. In the middle section of the width of the track belt, i.e. in the section fastened to the guide element, no changes take place in the length when the track belt is curved, which is why the depth of the folds may be smaller in the middle section of the track belt than at the edges of the track belt.

In yet another preferred embodiment of the track belt according to the invention, the bearing element and the guide element are separate elements fastened to each other. The bearing element and the guide element may also be made of different materials. The material of the bearing element may be, for example, polyurethane, plastic, or rubber, and the guide element may be made of plastic or polyurethane.

A preferred embodiment of the track belt according to the invention is a track belt for a tracked vehicle, such as a snow mobile. The bendable track belt makes it possible to steer the vehicle by changing the curvature of the track belt. Alternatively, the track belt may be a conveyor belt for a belt conveyor. The conveyor belt that can be brought to a curved shape increases the possibilities for using and installing conveyors. Preferably, the track belt is an endless annular component.

The track assembly according to the invention comprises an endless track belt and steering members movable in a direction transverse to the longitudinal direction of the track belt, for applying a force on the track belt. The track belt is a track belt as defined above.

In a preferred embodiment of the track assembly according to the invention, the steering members comprise at least one slide piece arranged in a first guide groove of the track belt, and at least one slide piece arranged in a second guide groove of the track belt. Preferably, the steering members further comprise at least one guide wheel arranged on a first side of a first edge protrusion of the guide element of the track belt, and at least one guide wheel arranged on a first side of a second edge protrusion of the guide element. Preferably, said guide wheels comprise a bottom surface fitted to abut against the free edge of the edge protrusions.

In another preferred embodiment according to the invention, the track assembly comprises a first reverse roll and a second reverse roll, the track belt being configured to turn around said first and second reverse rolls, and said steering members are arranged in the track belt portion between the first and second reverse rolls.

The invention has the advantage that it makes it possible to bring the track belt to a curved shape in a reliable and secure way.

BRIEF DESCRIPTION OF THE DRAWINGS

In the following, the invention will be described in detail. In the description, reference will be made to the appended drawings, in which.

DETAILED DESCRIPTION

Figure 1A:
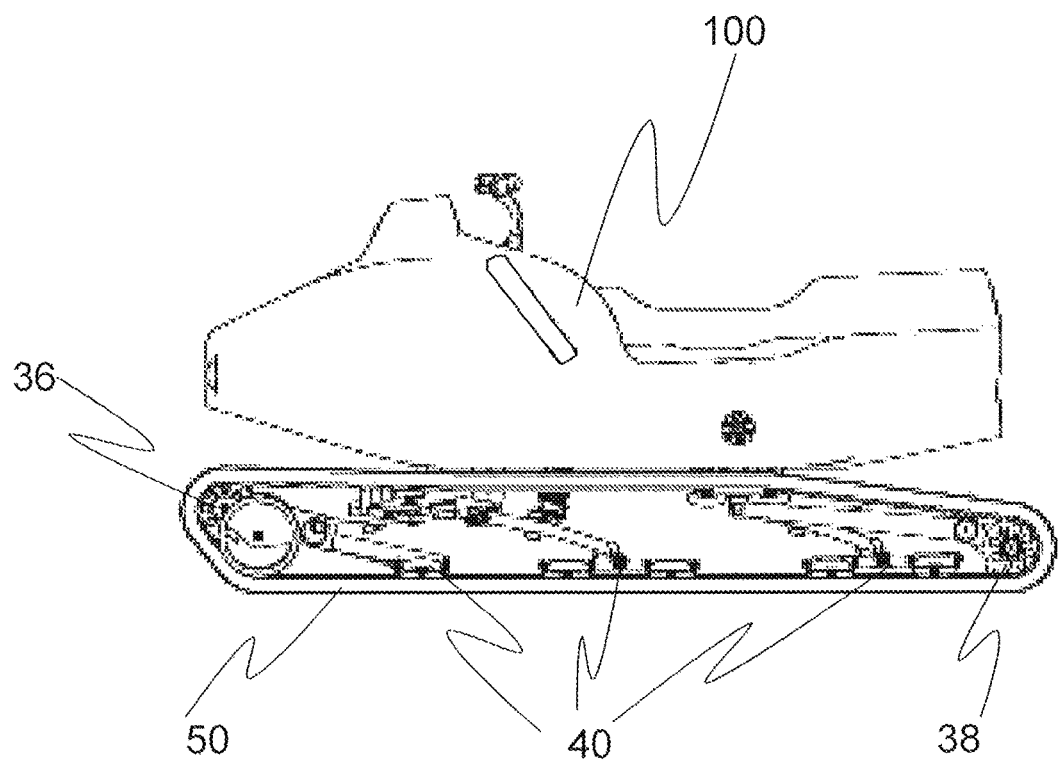
FIG. 1a shows, by way of an example, a vehicle equipped with a track belt according to the invention, seen from the side.
Figure 1B:
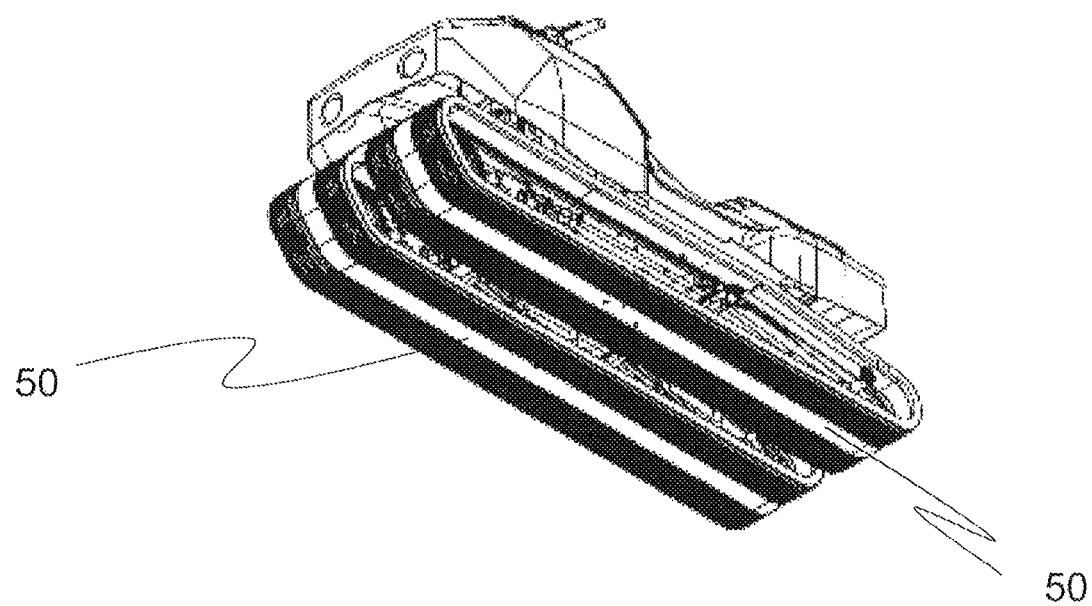
FIG. 1b shows the vehicle of FIG. 1a seen diagonally from below.

FIG. 1a shows, by way of an example, a vehicle 100 equipped with a track belt 50 according to the invention seen from the side, and FIG. 1b shows the same vehicle seen diagonally from below. In the following, both figures will be described at the same time.

The vehicle shown in FIGS. 1a and 1b is a snow mobile whose frame is equipped with a track assembly comprising two parallel drive tracks. Both tracks of the track assembly comprise a first reverse roll 36, a second reverse roll 38, and an endless track belt 50 turned around the reverse rolls. Furthermore, the track assembly comprises a drive wheel not shown in the figure, powered by the motor of the vehicle, for subjecting the track belt to a force rotating the track belt. Steering members 40 are provided between the reverse rolls, for subjecting the track belt to a force in a direction transverse to the longitudinal direction of the track, whereby the track belt is curved; in other words, the track belt is offset by the steering members in the lateral direction from the straight line between the first and second reverse rolls. By changing the curvature of the track belt, the snow mobile can be made to turn and move in a desired travel direction. By the steering members, a force making the track belt curve is applied primarily to the lower part of the track belt, placed against the ground to be traveled on, because this part of the track belt has an effect to the travel direction of the vehicle. The upper part of the track belt may be curved to a lesser extent than the lower part of the track belt, or it may even be substantially straight, wherein it extends the distance between the first and second reverse rolls along a straight line. The snow mobile shown in FIGS. 1a and 1b comprises two parallel tracks. It is not necessary to have two tracks but the vehicle may also be implemented with a single track.

Figure 2A:
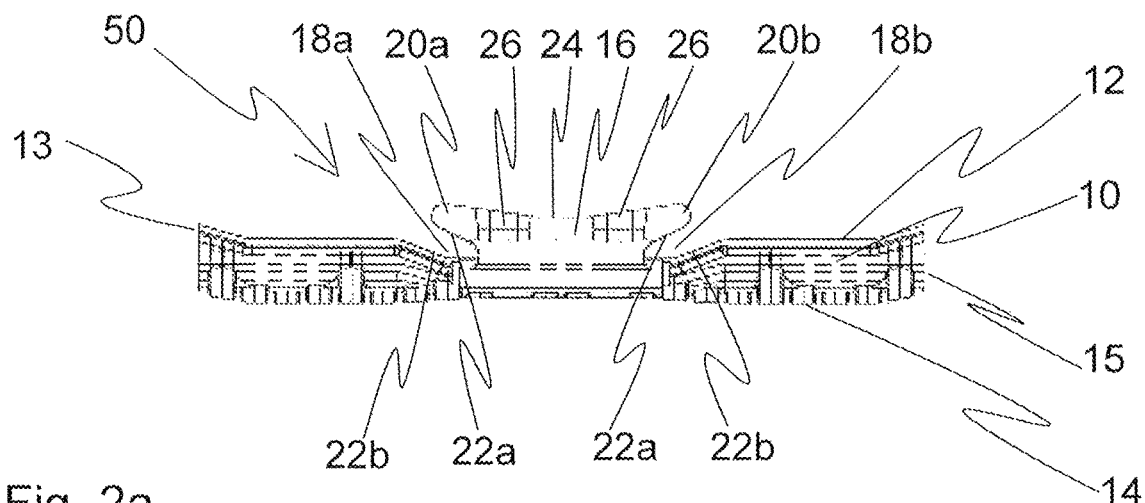
FIG. 2a shows, by way of an example, a track belt according to the invention in a cross-sectional view.
Figure 2B:
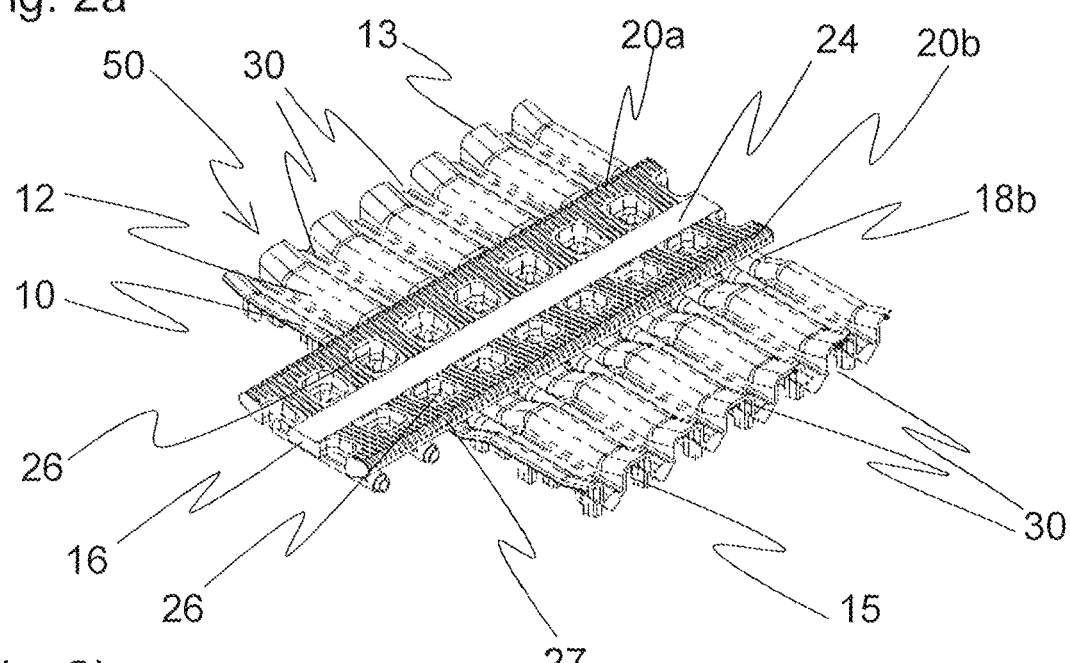
FIG. 2b shows, by way of an example, a track belt portion according to the invention seen diagonally from above.

FIG. 2a shows, by way of an example, a track belt 50 according to the invention in a cross-sectional view, and FIG. 2b shows part of the track belt of FIG. 2a in a diagonal view from above. The track belt comprises an endless belt-like bearing element 10 having an inner surface 12 and an outer surface 14. The outer surface of the track belt is the surface placed against the ground when the vehicle equipped with the track belt is moving. The inner surface of the track belt, in turn, is the surface which remains surrounded by the outer surface in an endless annular track belt. The bearing element has a folded shape; in other words, it has parallel groove-like folds 30 over the entire length of the track belt so that every other fold opens in the direction of the inner surface and every other fold opens in the direction of the outer surface. The folds extend from the first edge 13 of the track belt to the second edge 15 of the track belt, i.e. over the whole width of the track belt. The width of the track belt may be suitably selected according to the dimensions of the vehicle. Preferably, the width of the track belt is 280 mm to 800 mm.

An elongated guide element 16 is provided on the inner surface 12 of the bearing element 10 of the track belt 50, extending, on the inner surface, over the whole length of the track belt. The guide element is placed in the centre of the bearing element in the cross direction of the track belt; that is, the distance between the guide element and the first edge 13 of the bearing element is equal to the distance between the guide element and the second edge 15. At the guide element, the inner surface of the bearing element is provided with a recess having a width substantially equal to the width of the bearing element, and a depth about one third of the total thickness of the bearing element.

The guide element is provided with a first edge protrusion 20a at the first edge and a second edge protrusion 20b at the second edge so that the edge protrusions point away from each other, pointing slightly upwards from the inner surface 12 of the bearing element 10. The surface of the edge protrusions on the side of the inner surface of the bearing element is spaced from the inner surface. The guide element is provided with a first guide groove 18a on the first side and a second guide groove 18b on the second side so that the surface of the edge protrusion 20a, 20b on the side of the inner surface of the bearing element constitutes a first flank surface 22a of the guide groove, and the inner surface of the bearing element constitutes a second flank surface 22b of the guide groove. The width of the guide element, i.e. the shortest distance between the free edges of the edge protrusions, is about 30 to 50% of the width of the bearing element.

In the portion between the free edges of the edge protrusions 20a, 20b of the guide element 16, a traction surface 24 is provided which is equipped with engaging members 26 in the form of engaging holes at regular intervals in two rows, for receiving the engaging parts of the drive wheel. The force for rotating the track belt is applied from the drive wheel via the engaging members to the guide element. Instead of the engaging holes, the engaging elements may be engaging hollows or engaging protrusions compatible with the engaging members of the drive wheel. The guide element is an element that sustains a tensile load and is substantially inextensible at normal loading of the track belt. The surface of the traction surface 24 is provided with bending grooves 27 at regular intervals, facilitating the bending of the guide element into a curve when it passes around the reverse roll 36, 38. The guide element and the bearing element may be made of the same material, or they may be parts made of different materials and connected to each other by mortise and tenon joints. Preferably, the guide element is made of plastic and the bearing element is made of plastic or rubber.

Figure 2C:
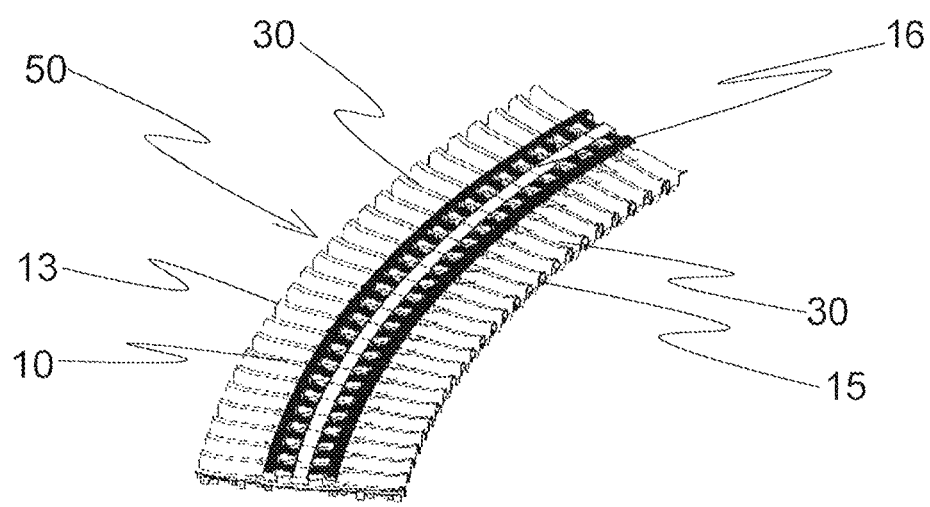
FIG. 2c shows, by way of an example, a curved track belt portion according to the invention, seen diagonally from above.

FIG. 2c shows, by way of an example, a piece of a track belt 50 according to the invention in a diagonal view from above. The piece of the track belt shown in the figure has been bent to a curve by subjecting the guide element 16 of the track belt to a force in a direction perpendicular to the longitudinal direction of the track belt, as will be described hereinbelow. In this context, the curved shape of the track belt means that the central part and the ends of the track belt are substantially on the same height level, but the central part is not on the same straight line with the ends of the track belt. As the track belt is curved, the length of its guide element is not changed but the second edge 15 closer to the centre of curvature of the bearing element 10 becomes shorter, and the first edge 13 farther from the centre of curvature becomes longer. The folded shape of the bearing part allows for changes in the length of the edges of the bearing element so that when the edges of the bearing element become shorter and longer, the folds 30 become narrower and are opened, respectively. The folds in the track belt also enable the turning of the track belt around a curved surface, such as the driving reverse roll. In the track belt being turned around a reverse roll or a roller, the folds in the bearing element are opened, which enables the "stretching" of the bearing element when it travels across the reverse roll.

Figure 3A:
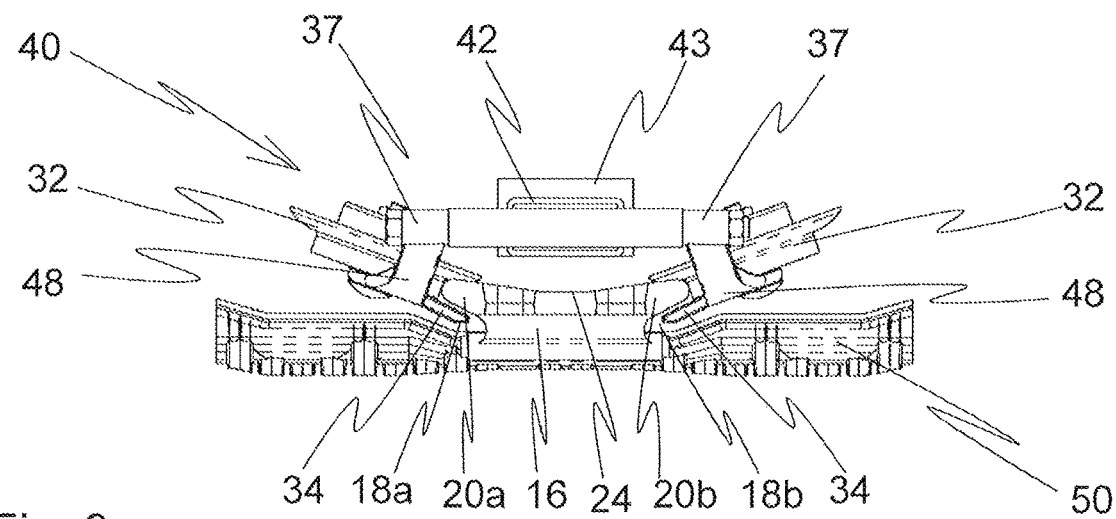
FIG. 3a shows, by way of an example, steering members for the track belt according to the invention, seen from the front.
Figure 3B:
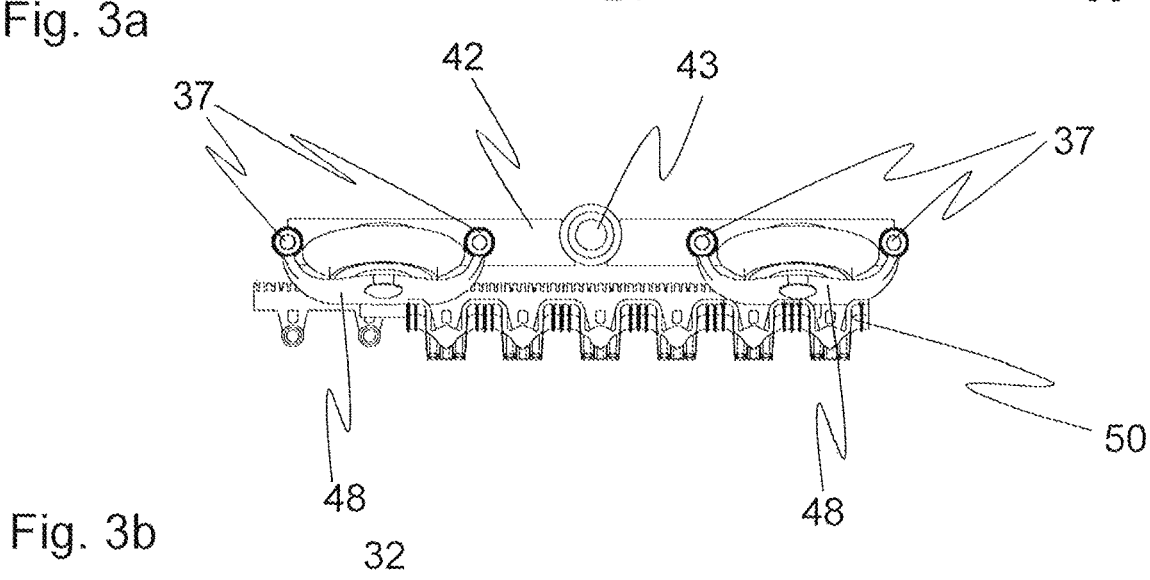
FIG. 3b shows the steering members for the track belt of FIG. 3a, seen from the side.
Figure 3C:
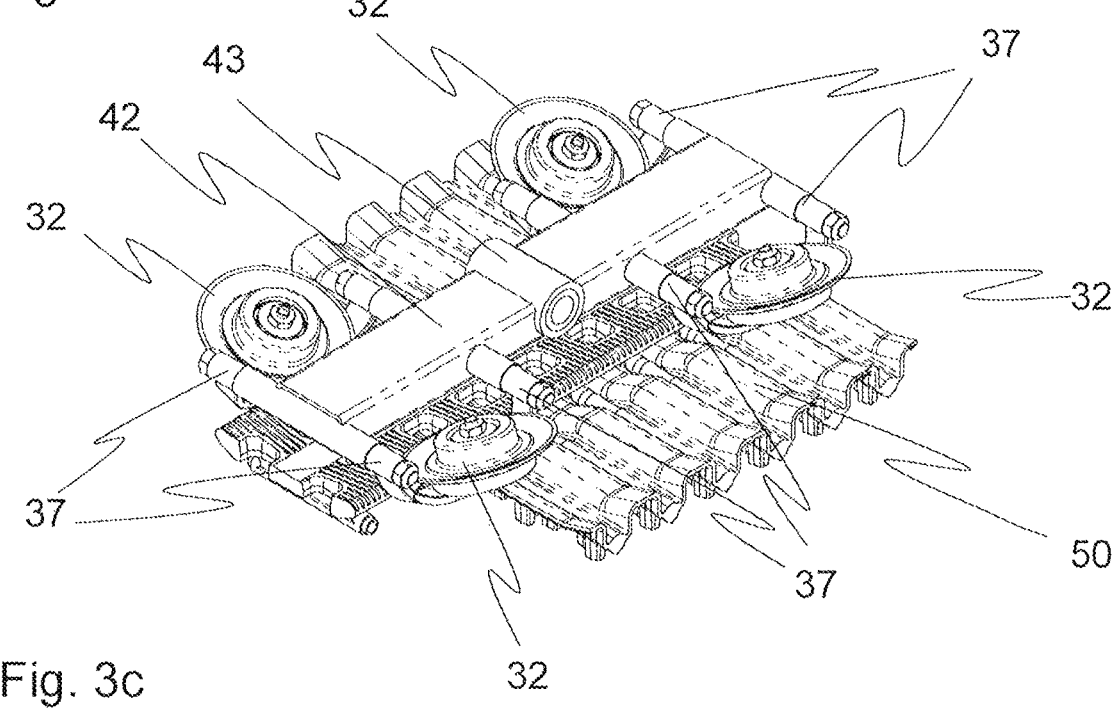
FIG. 3c shows the steering members for the track belt of FIGS. 3a and 3b, seen diagonally from above.

FIG. 3a shows, by way of an example, part of the steering members for a track belt 50 belonging to a track assembly according to the invention, in a front view; FIG. 3b shows it in a side view, and FIG. 3c shows it in a diagonal view from above. In the following; all the figures will be described at the same time. The steering members for the track belt according to the invention comprise an elongated beam 42 with a central through sleeve 43 for receiving a steering arm not shown in the figure. By means of the steering arm, a force is applied to the beam in the longitudinal direction of the hole in the sleeve; i.e. in a direction transverse to the longitudinal direction of the beam. On both sides of the beam, two pairs of fastening pins 37 are provided so that the first pair of fastening pins is placed close to the first end of the beam, and the second pair of fastening pins close to the second end of the beam. Two supporting elements 48 are fastened to the fastening pins, one on each side of the beam 42 so that the ends of the supporting elements are fastened to the ends of the fastening pins. The supporting element is provided with a protruding slide piece 34 (FIG. 3a) which extends into the guide groove 18a, 18b of the track belt 50. A guide wheel 32 rotatable about an axle journal is mounted to the central part of the supporting element, having a cylindrical bottom part and a flange part protruding from one edge of the bottom part. The flange part is placed on the side of the edge protrusion 20a, 20b of the guide element 16 facing the traction surface 24 so that the flange part and the slide piece constitute a gap, in which the edge protrusion of the guide element is received. On the first side of the beam 42, two gaps are formed by the flange part of the guide wheel 32 and the slide piece 34, bordering the first edge protrusion 20a, and similarly, two gaps are formed on the second side of the beam by the flange part of the guide wheel 32 and the slide piece 34, bordering the second edge protrusion 20b (FIG. 3a). The cylindrical bottom part of the guide wheel engages the free edge of the edge protrusion. When the beam is moved in a direction transverse to the longitudinal direction of the track belt, the bottom part of the guide wheel applies a force to the free edge of the edge protrusion, bending the track belt into a curve. The flange part of the guide wheel and the slide piece secure that the free edge of the edge protrusion remains in constant contact with the guide wheel.

The track belt and the track assembly according to the invention are particularly suitable for use in tracked vehicles and means of transport. Furthermore, it is feasible that the track belt could be used as a conveyor belt for a belt conveyor, which could be configured to travel along a curved path, if needed.

Some advantageous embodiments of the track belt and the track assembly according to the invention have been described above. The invention is not limited to the solutions described above, but the inventive idea can be applied in different ways within the scope of the claims.

The invention claimed is:

1. A track belt configured to turn around reverse rolls and comprising a belt like bearing element, the bearing element having an inner surface, an outer surface, and a width, a guide element in the longitudinal direction of the track belt in the inner surface of the bearing element, the guide element comprising a first edge protrusion and a second edge protrusion, and the guide element having a width substantially smaller than the width of the bearing element, and the track belt further comprising a first guide groove with a first flank surface formed by the first edge protrusion, and a second guide groove with a first flank surface formed by the second edge protrusion, wherein the first flank surfaces of the edge protrusions are uniform and continuous substantially over the entire length of the guide element, and the guide element comprising a traction surface extending substantially in parallel with the inner surface of the bearing element and comprising engaging members for receiving engaging parts of a drive wheel.

2. The track belt according to claim 1, wherein the width of the guide element is less than 50% of the width of the bearing element.

3. The track belt according to claim 2, wherein the width of the guide element is less than 30% of the width of the bearing element.

4. The track belt according to claim 1, wherein the first and second guide grooves are provided with a second flank surface formed by the inner surface of the bearing element.

5. The track belt according to claim 1, wherein the guide element an element that sustains tensile load and is substantially inextensible at normal loading of the track belt.

6. The track belt according to claim 1, wherein the guide element at least one reinforcing element for improving the tensile strength in the longitudinal direction of the guide element.

7. The track belt according to claim 1, wherein the traction surface comprises bending grooves transverse to the longitudinal direction of the guide element, at substantially regular intervals over the entire length of the guide element.

8. The track belt according to claim 1, wherein the bearing element comprises folds transverse to the longitudinal direction of the track belt, over the entire length of the track belt.

9. The track belt according to claim 8, wherein the depth of the folds is smaller in the middle portion of the track belt than at the edges of the track belt.

10. The track belt according to claim 1, wherein the track belt is an endless annular component.

11. The track belt according to claim 1, wherein the bearing element and the guide element are separate components fastened to each other.

12. The track belt according to claim 1, wherein the track belt is a track belt for a tracked vehicle.

13. The track belt according to claim 12, wherein it is a track belt for a snow mobile.

14. The track belt according to claim 1, wherein the track belt is a conveyor belt for a belt conveyor.

15. A track assembly comprising an endless track belt and steering members movable in a direction perpendicular to the longitudinal direction of the track belt, for applying a force to the track belt, wherein said track belt is the track belt defined in claim 1.

16. The track assembly according to claim 15, wherein said steering members comprise at least one slide piece arranged in a first guide groove of the track belt, and at least one slide piece arranged in a second guide groove of the track belt.

17. The track assembly according to claim 15, wherein said steering members further comprise at least one guide wheel arranged on a first side of a first edge protrusion of the guide element of the track belt, and at least one guide wheel arranged on a first side of a second edge protrusion of the guide element.

18. The track assembly according to claim 17, wherein said guide wheels comprises bottom surface fitted to abut against a free edge of the edge protrusions.

19. The track assembly according to claim 15, wherein the track belt assembly comprises a first reverse roll and a second reverse roll, the track belt being configured to turn around said first and second reverse rolls, and said steering members are arranged in the track belt portion between the first and second reverse rolls.

* * * * *